US005529279A

United States Patent [19]

Beatty et al.

[11] Patent Number: 5,529,279
[45] Date of Patent: Jun. 25, 1996

[54] THERMAL ISOLATION STRUCTURES FOR MICROACTUATORS

[75] Inventors: Christopher C. Beatty, Landenberg, Pa.; James W. Baker, Elkton, Md.

[73] Assignee: Hewlett-Packard Company, Palo Alto, Calif.

[21] Appl. No.: 295,127

[22] Filed: Aug. 24, 1994

[51] Int. Cl.⁶ ............................ F16K 31/02; F03G 7/06
[52] U.S. Cl. .................. 251/11; 251/129.01; 251/368; 60/528; 60/529
[58] Field of Search .................. 251/11, 129.01, 251/368; 60/528, 529

[56]     References Cited

U.S. PATENT DOCUMENTS

| | | |
|---|---|---|
| 4,581,624 | 4/1986 | O'Connor . |
| 5,050,838 | 9/1991 | Beatty, et al. . |
| 5,058,856 | 10/1991 | Gordon, et al. . |
| 5,069,419 | 12/1991 | Jerman . |
| 5,161,774 | 11/1992 | Engelsdorf et al. ............ 251/11 |
| 5,333,831 | 8/1994 | Barth, et al . |
| 5,344,117 | 9/1994 | Trah et al. .................... 251/11 |

*Primary Examiner*—Kevin Lee
*Attorney, Agent, or Firm*—Mark Z. Dudley

[57]     ABSTRACT

A microactuator preferably in the form of a microminiature valve for controlling the flow of a fluid carried by a flow channel includes a first substrate having a thermally-actuated member selectively operated by a thermal actuator such that the first substrate thereby develops thermal energy, and a second substrate having opposed first and second major surfaces. The second substrate is attached to the first substrate at the first major surface. The second major surface defines an isolation cell for enclosing a volume when the second substrate is attached to the support to thereby reduce the thermal mass of the microactuator and to thermally isolate the first substrate from the support.

18 Claims, 16 Drawing Sheets

THERMAL ISOLATION STRUCTURES FOR MICROACTUATORS

TECHNICAL FIELD

The present invention relates generally to microminiature devices and more particularly to microactuators.

BACKGROUND ART

The development of microminiature mechanical devices has advanced generally by use of a technique known as micromachining or microfabrication. See for instance, the discussion of microfabrication of mechanical devices by Angell et al. in "Silicon Micromechanical Devices," Scientific American (April 1983), pp. 44–55.

One requirement in the design of a microminiature actuator (hereinafter, microactuator) is that some mechanical actuation means must be provided. A further requirement is that the actuation means must provide sufficient force for reliable actuation. Microactuators designed in the form of microminiature valves may, for example, be employed as gas flow regulators in setting the flow of a carrier gas through a capillary column in a gas chromatograph. The microfabricated valve may be required to open or close a moveable member (typically a moveable membrane, diaphragm, or valve face) against a pressure of 200 pounds per square inch (11 kilograms per square centimeter); to do so, the moving member may be displaced as much as 100 microns. Typically, power from an external power source is provided to the microactuator which employs one of various techniques to convert the applied power to an actuating force. Often the applied power is converted in part or whole to thermal energy, and such microactuators can be considered as being thermally-driven.

A micromachined bi-metallic diaphragm has been employed to provide a thermally-driven actuating force in a microactuator. As the bi-metallic diaphragm is heated, stresses are generated in the structure to deflect the diaphragm, thereby opening or closing the flow of fluid to an attached fluid-bearing system. For example, and with reference to FIGS. 3 and 4 which are reproduced from commonly-assigned U.S. Pat. No. 5,058,856, issued to Gordon et al., a thermally-driven microminiature valve 40 may be actuated from a closed configuration illustrated in FIG. 3, to an open configuration illustrated in FIG. 4. The valve 40 includes a seat substrate 42 which acts as a base; a central flow orifice 44, a lower periphery 45, and a valve seat 46 that surrounds the flow orifice 44. Supported atop the seat substrate 42 is an upper substrate 49 that includes a fixed periphery 47, a central flexible member 50, a lower layer 48 of the flexible member 50, and a boss 43. A nickel layer 51 and an additional serpentine pattern of nickel in a heating element 52 are deposited on a silicon layer 48. Electrical current from an external power source may be conducted through heating elements 52 to generate thermal energy in the form of localized heating, which then conducts through the silicon and nickel layers 48, 51 to cause a temperature increase of approximately 100 degree(s) C. over ambient temperature. The temperature increase causes the valve to open whereupon gas will flow through the flow orifice 44.

However, thermal energy is lost through several paths and in several modes of dissipation. When the valve is closed, thermal energy is conducted from the armature 48 through the boss 43 in the upper substrate to the valve seat 46 and into the bulk of the seat substrate 42. Thermal energy is conducted from the heating pads 52 through the fixed periphery 47 to the seat substrate 42, and gas phase conduction occurs from the lower layer 48 to the seat substrate 42. The thermal energy may flow further into any thermally-conductive structure that is contiguous with the seat substrate 42. The extent of the loss of thermal energy will determine the temperature of the armature; in turn, this temperature (and its rate of change) have a significant effect on the performance of the valve.

Thermally-driven phase change of a fluid has been employed as an actuating force in a microactuator; thermally-driven expansion or contraction of a fluid has also been used as an actuating force. The principal elements of an expansion-contraction design include a cavity formed in a substrate wherein one wall of the cavity is a thin, flexible membrane. The cavity encloses a fixed number of moles of gas or fluid, and when the temperature of the fluid in the cavity is increased, there is a concomitant increase in the pressure-volume (P-V) product of the gas or fluid. The temperature of the cavity may be varied by, for instance, the application of electrical current to a resistive heating element mounted on or inside the cavity, such that the resistive element heats the gas or fluid trapped in the cavity. See, for example, U.S. Pat. No. 4,824,073, issued to Zdeblick.

Irrespective of the type of thermal actuation that is employed in a microactuator, there remains a common need that the thermal energy be efficiently and effectively utilized. Energy that is not efficiently utilized is dissipated from the microactuator in the form of excess heat and as a result the microactuator suffers from unwanted power consumption. Moreover, any portions of the microactuator that are thermally coupled to the thermally-actuated member will accumulate heat. As a result, the microactuator might not actuate as fast as desired, due to the time expended by the thermally-actuated member in dissipating its accumulation of thermal energy when changing from a heated to an unheated (or cooled) state. These problems are especially disadvantageous in microactuators used in fluid flow control applications, such as in pneumatic flow control in gas chromatography, wherein fast actuation is necessary.

Accordingly, there is a need in thermally-actuated microactuators (and especially in microactuators such as are illustrated in FIGS. 3 and 4) for improved thermal isolation of the microactuator with respect to a supporting structure.

SUMMARY OF THE INVENTION

A thermally-actuated microactuator that is positionable on a support may be constructed according to the present invention to include a first substrate having a thermally-actuated member selectively operated by a thermal actuator such that the first substrate thereby develops thermal energy, and a second substrate having opposed first and second major surfaces. The second substrate is attached to the first substrate at the first major surface. The second major surface defines an isolation cell for enclosing a volume when the second substrate is attached to the support to reduce the thermal mass of the microactuator and to thermally isolate the thermal energy developed in first substrate.

In a first preferred embodiment of the present invention, a microminiature valve for controlling the flow of a fluid may be constructed to include a first substrate having opposed first and second major surfaces, the first major surface including a valve seat structure, and the second major surface including central and peripheral regions and an isolation cell defined therebetween, and a flow via extending between the valve seat structure and the central region. The central and peripheral regions are positionable on the support for fluid communication between the flow via and the channel and for enclosing a volume between the isolation cell and the support to thereby thermally isolate the first substrate from the support. A second substrate may be provided to include an armature positionable in a closed position in contact with the valve seat structure to obstruct fluid flow to the flow via, and in an open position to allow fluid flow through the flow via. Means are provided for selectively displacing the armature between said closed and open positions.

A second preferred embodiment of a novel microactuator in the form of a microminiature valve includes the first substrate described above and a second substrate including a lower major surface that is etched to form a central region, a peripheral region, and a via surround so as to define an isolation cell. A substrate plate defines a central bore that aligns coaxially with the flow via upon attaching the substrate plate to the lower major surface, so as to enclose the isolation cell in lieu of the support.

A third preferred embodiment of a novel microactuator in the form of a microminiature valve includes a first substrate having a thermally-actuated member selectively operated by a thermal actuator, the first substrate thereby developing thermal energy therein; and a second substrate having opposed first and second major surfaces, the second substrate being attached to the first substrate at the first major surface. The second major surface comprises central and peripheral regions with a flow via extending between the central region and the first major surface to effect a fluid flow therethrough. The flow via is subject to closure by actuation of the thermally-actuated member. A port plate includes upper and lower opposing surfaces and a flow port therebetween, wherein the upper surface defines an isolation cell for enclosing a volume. The upper surface of the port plate is attached to the second major surface, with the flow port being aligned with the flow via and the flow channel, to enclose the isolation cell to thereby thermally isolate at least a portion of the thermal energy developed in the first substrate.

A thermally-actuated microactuator that is constructed according to the teachings of the present invention will benefit from a reduction of power consumed by the thermal actuator. Also, the presence of the isolation cell reduces the thermal mass of the microactuator and accordingly increases its responsiveness.

BEST MODE OF CARRYING OUT THE INVENTION

The present invention is directed to thermal isolation structures for microactuators. Whereas the following description is directed to a microactuator in the form of a microminiature valve, it is contemplated that the teachings of the present invention may find application in other types of thermally-driven microactuators. This characterization of actuators as being "thermally-driven" is meant to include microactuators that operate on the conversion of an applied quantity of energy into an actuation force for moving a movable member, wherein the conversion benefits from conservation or isolation of the thermal energy that may arise in the course of the conversion. Examples are microactuators that are driven by forces developed in a process of gas or liquid expansion/contraction, gas or liquid phase change, or according to changes in bi-metallic or shape-memory materials. Accordingly, the present invention will find use in a variety of microactuators that may be employed to operate upon a mechanical device or system, or upon a physical phenomena, such as the flow of fluids (including gases and liquids), electrical and electronic parameters (such as capacitance, current flow, and voltage potential), acoustical and. optical parameters (such as reflection, absorption, or diffraction) and simple dimensional parameters (such as acceleration, pressure, length, depth, and so on).

Figure 1:
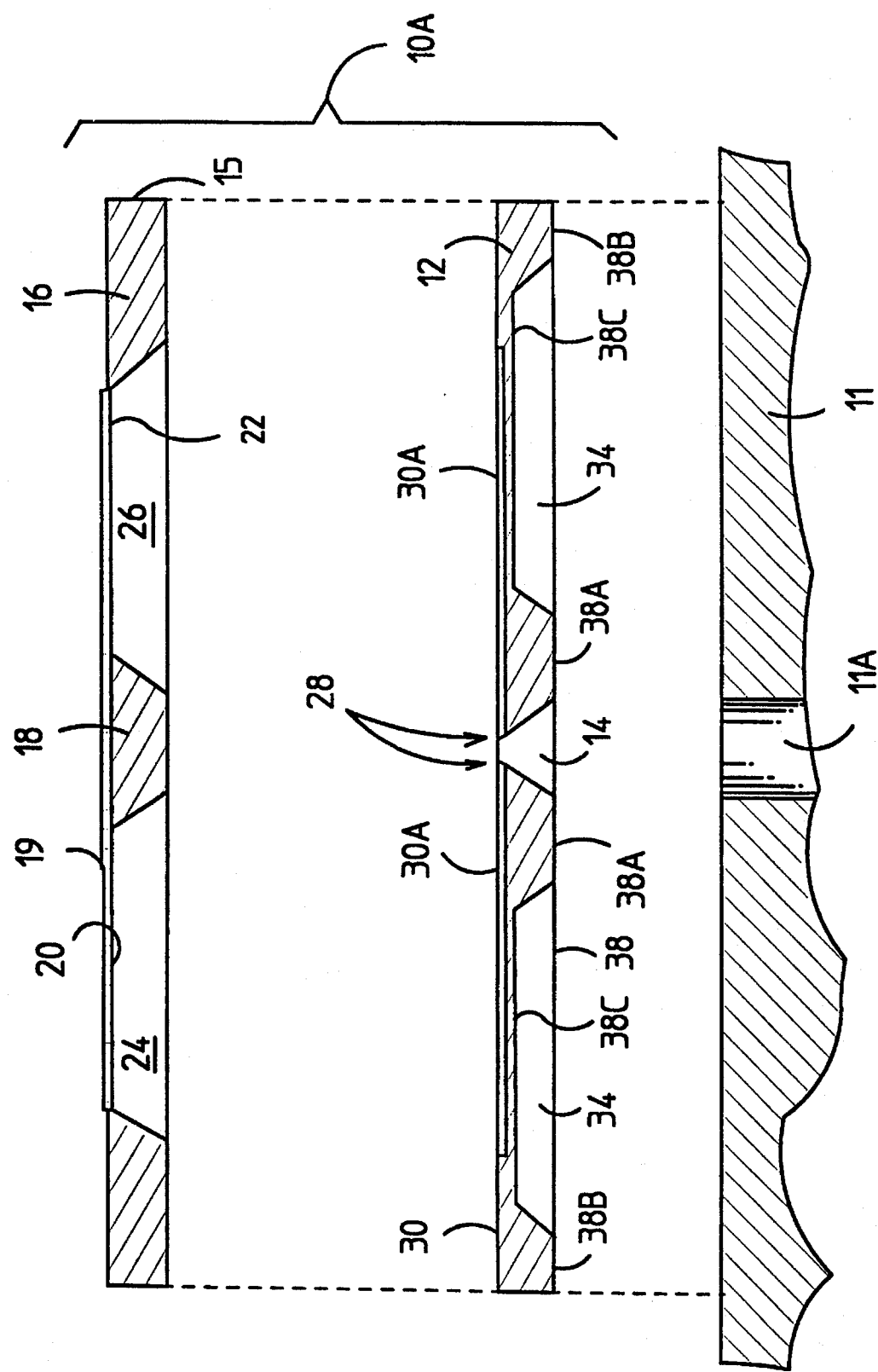
FIG. 1 is an exploded side sectional view of a microactuator constructed according to the present invention and preferred for use as a microminiature valve.

With reference to FIG. 1, a first preferred embodiment of a novel microactuator in the form of a microminiature valve 10A, mountable on a support 11 having a flow channel 11A, includes a seat substrate 12 which acts as a base. The seat substrate 12 is preferably a silicon chip which has been fabricated from a wafer using batch processing steps. At its periphery, the seat substrate is approximately 1000 thick. A central flow via 14 is formed through the seat substrate 12. (The term "via" is used herein in accordance with its typical usage in the integrated circuit fabrication art, as describing a fine void or through-hole in a fabricated layer.) Supported atop the seat substrate 12 is an upper substrate 15 also formed from silicon that includes a fixed periphery 16 and a thermally-actuated member in the form of a central boss 18. The length and the width of the upper substrate 15 roughly match the respective dimensions of the seat substrate 12. The structure and the operation of the upper substrate 15 are disclosed in commonly-assigned U.S. Pat. No. 5,058,856 to Gordon et al., the disclosure of which is incorporated herein by reference. Briefly, a layer 19 of nickel is deposited and patterned on the upper substrate using the techniques of evaporation, photolithography, and electroplating. An array of legs 20 and 22 join the fixed periphery 16 to the central boss 18. The thickness of the silicon that forms the legs is a factor in determining the amount of maximum opening of the microminiature valve 10A. Hence, the ideal thickness of the silicon layer will vary according to application.

The seat substrate 12 includes a valve seat 28 against which the boss 18 is seated when the boss is in the closed position. The valve seat 28 extends from a relief 30A in an upper major surface 30 of the seat substrate 12. The valve seat 28 is formed by anisotropically etching the seat substrate 12 at the upper major surface 30 of the substrate. As will be described more fully below, an isolation cell 34 is defined by shaping a lower major surface 38 into a central region 38A and a peripheral region 38B separated by a surround 38C. When the nickel layer 19 in the upper substrate 15 is heated via the passage of an electrical current therethrough, the difference in coefficients of thermal expansion of the silicon and the nickel causes the legs to arch, lifting the boss 18 away from the seat substrate 12. When the boss is spaced apart from the seat substrate 12, the flow via 14 provides fluid communication between the flow channel 11A with surrounding areas 24 and 26. In turn, these areas 24 and 26 are in fluid communication with an apparatus (not shown) to or from which flow is to be regulated by the microminiature valve 10A.

Preferably, the surround 38C has a thickness sufficiently slight so as to minimize its effect as a lateral shunt (i.e., conductor) of thermal energy originating from the legs 20, 22 that is conducted through the gas within surrounding areas 24, 26 to the surround 38C. A preferred thickness for the surround 38C is selected from a range of approximately 1 to 10 microns. The area occupied by the isolation cell 34 is preferably between 10 and 90 percent of the surface area of lower major surface 38; the depth of the isolation cell is preferably between 10 and 90 percent of the overall thickness of the seat substrate 12. When the valve 10A is fixed to the support 11, a volume filled with gas, such as air or nitrogen (depending upon the ambient conditions when the seat substrate is mounted to the support) is thereby enclosed in the isolation cell. The enclosed volume thus acts as a thermal insulator and accordingly the presence of the isolation cell 34 allows greater conservation of the thermal energy developed in the upper substrate 15. Furthermore, by provision of the isolation cell 34, the thermal mass of the seat substrate 12 is greatly reduced and accordingly less thermal energy will accumulate in the seat substrate 12, and the thermal resistance of the thermal path between the seat substrate 12 and the support 11 is increased.

While the valve 10A has been described as including an array of legs 20 and 22, the present invention is not limited to use with actuation by means of arching legs. For example, the structure that connects the central boss 18 to the fixed periphery 16 may instead be a solid circular diaphragm which is selectively deflected to regulate fluid flow between the flow via 14 and the areas 24 and 26. The width of the valve seat 28 is readily varied, but is chosen to be sufficiently great that the valve seat is not susceptible to fracturing upon repeated closing of the boss 18. In the first preferred embodiment, the flow orifice 14 is 200 microns square, while the radially outward periphery of the bearing surface is 240 microns square. As is disclosed in U.S. Pat. No. 5,058,856 to Gordon et al., the illustrated configuration of the valve seat 28 and the flow orifice 14 improve both the pneumatic and thermal characteristics of the microminiature valve 10A. A particularly advantageous valve seat may be found in commonly-assigned U.S. Pat. No. 5,333,831, entitled "High Performance Micromachined Valve Orifice and Seat" and issued to Phillip W. Barth and Gary B. Gordon, the disclosure of which is incorporated herein by reference.

The steps for fabrication of the valve 10A generally proceed as follows. In a first wafer of silicon, designated the orifice wafer, a process of batch-fabrication silicon micromachining techniques are used to fabricate certain features such as the raised valve seat 28. Following these fabrication steps the orifice wafer is separated by sawing the wafer into individual orifice chips, and each orifice chip is cleaned. (The specific steps for fabrication of the seat substrate in the orifice wafer are described with respect to FIGS. 5–11, below.) A second wafer of silicon, designated the actuator wafer, receives a layer of silicon dioxide, and then a layer of silicon nitride, on the upper and lower major surfaces of the second wafer. These layers are photolithographically patterned on the upper and lower major surfaces to form areas which will later be etched. For example, the silicon dioxide and silicon nitride layers are patterned on the lower major surface of the actuator wafer to define regions that will become the boss 18. Next, a layer of nickel is deposited on the upper major surface using evaporation or sputtering, and this nickel is patterned to leave both thin-film resistor regions and other regions which will later be electroplated with thick nickel. A layer of photoresist is deposited and is photolithographically patterned and etched to define holes through the photoresist. Next, electroplating is carried out to form thick nickel regions. While the upper major surface of the actuator wafer is protected by the nickel or nitride layers, the lower major surface of the wafer is etched in aqueous potassium hydroxide, forming (among other things) the boss 18 on the bottom side of the actuator wafer. Selected portions of the nitride layer are then removed by plasma etching to allow further etching in potassium hydroxide (KOH) of both sides of the wafer to clear the areas between the legs. The individual valves 10A may be packaged and bonded onto the support 11 by known techniques, preferably in the presence of an atmosphere of dry air or a gas of low thermal conductivity, such as nitrogen, such that the isolation cell 34 is suitably gas-filled. Alternatively, for even greater thermal isolation, the completed valve 10A may be assembled and bonded on the support 11 in an evacuated environment such that the isolation cell 34 encloses a vacuum or near-vacuum.

Figure 5:
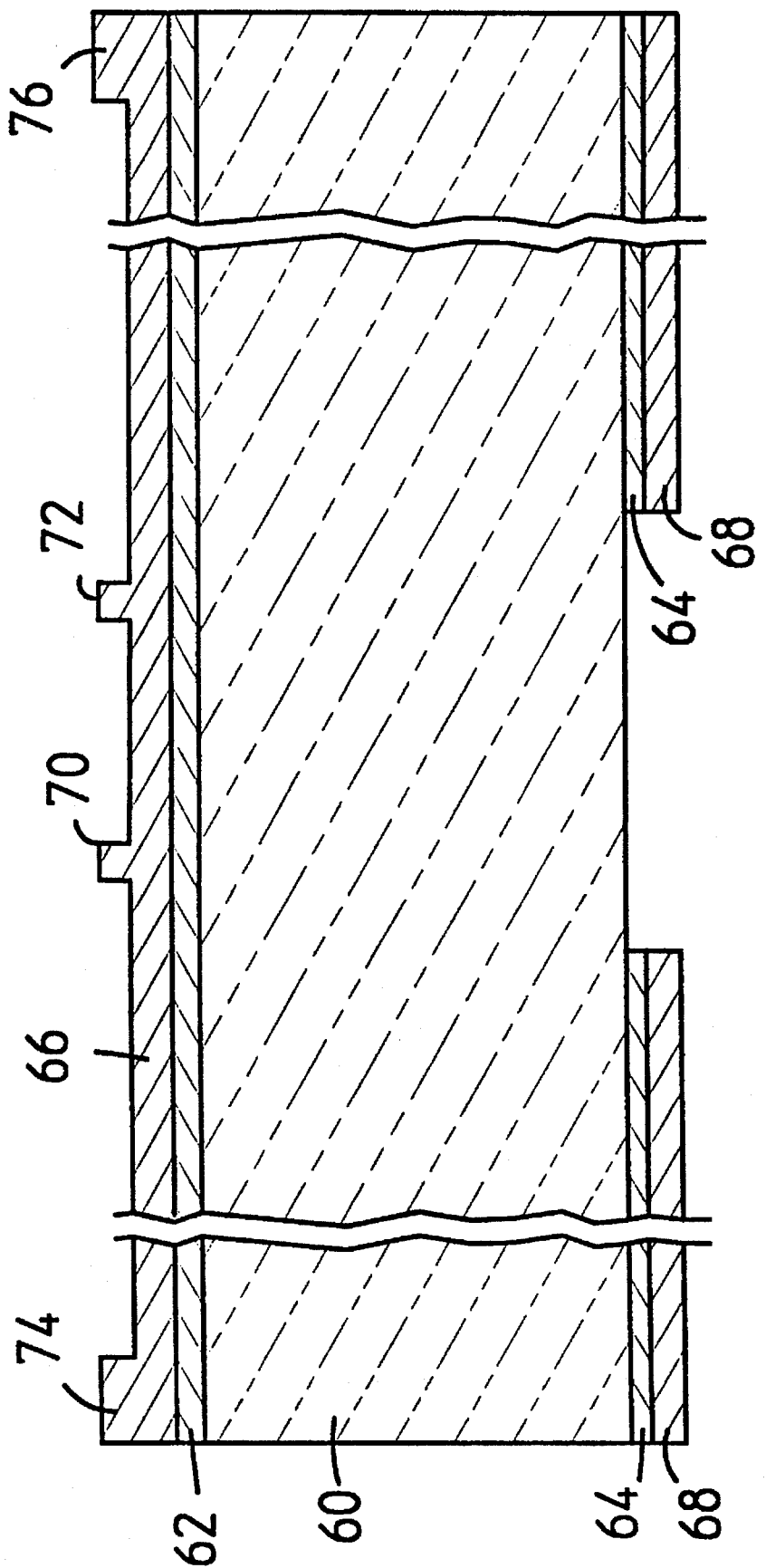
FIGS. 5 through 11 illustrate steps for fabricating a first preferred embodiment of a seat substrate useable in the microactuator of FIG. 1.

In particular, FIGS. 5–10 illustrate a method of manufacturing the seat substrate 12 of the valve 10A. In FIG. 5, conventional masking materials are photolithographically patterned at both of the major surfaces of the silicon wafer 60. Each major surface has a first layer of silicon oxide 62 and 64 and an outer layer of silicon nitride 66 and 68. Using conventional plasma etching techniques, approximately 50% of the nitride outer layer 66 at the upper surface is removed at portions of the layer, leaving thick nitride areas 70 and 72 for use in defining a valve seat and leaving outer thick nitride areas 74 and 76 for use in defining the extent of the upper valve face. At the lower surface of the silicon wafer 60, the oxide and nitride layers 64 and 68 are completely etched at a central region. Hydrofluoric acid is used in etching the bottom oxide.

Figure 6:
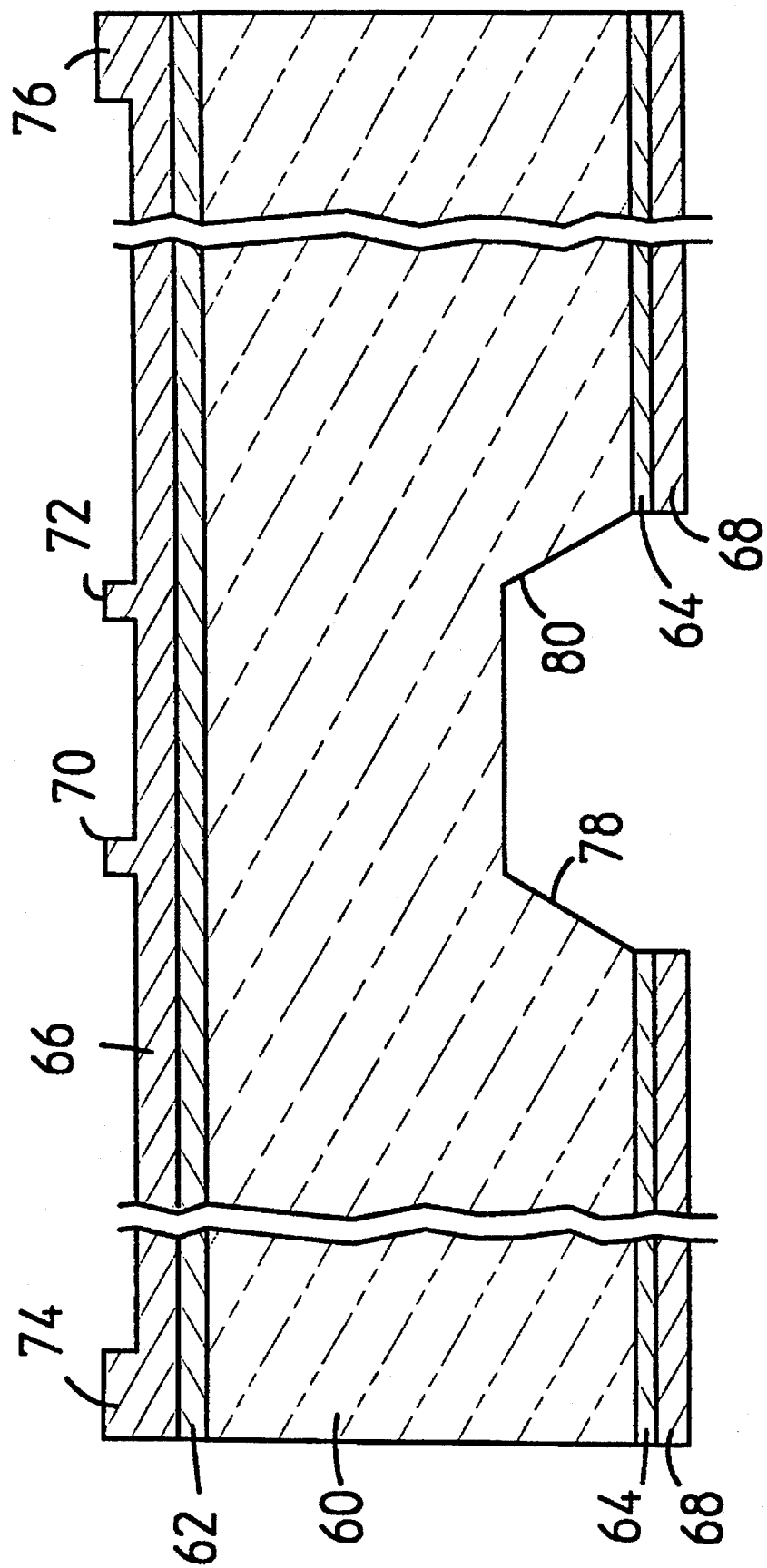

In FIG. 6, potassium hydroxide (KOH) is used to etch through the central region of the bottom of the silicon wafer 60 that was exposed in the etching of the silicon nitride layer 68 and the oxide layer 64. The silicon is etched more slowly along (111) planes, thereby providing the sloped walls 78 and 80. Anisotropically etching the silicon wafer will produce walls having an angle of approximately 54 degrees. The anisotropic etch extends partially through the silicon wafer.

Figure 7:
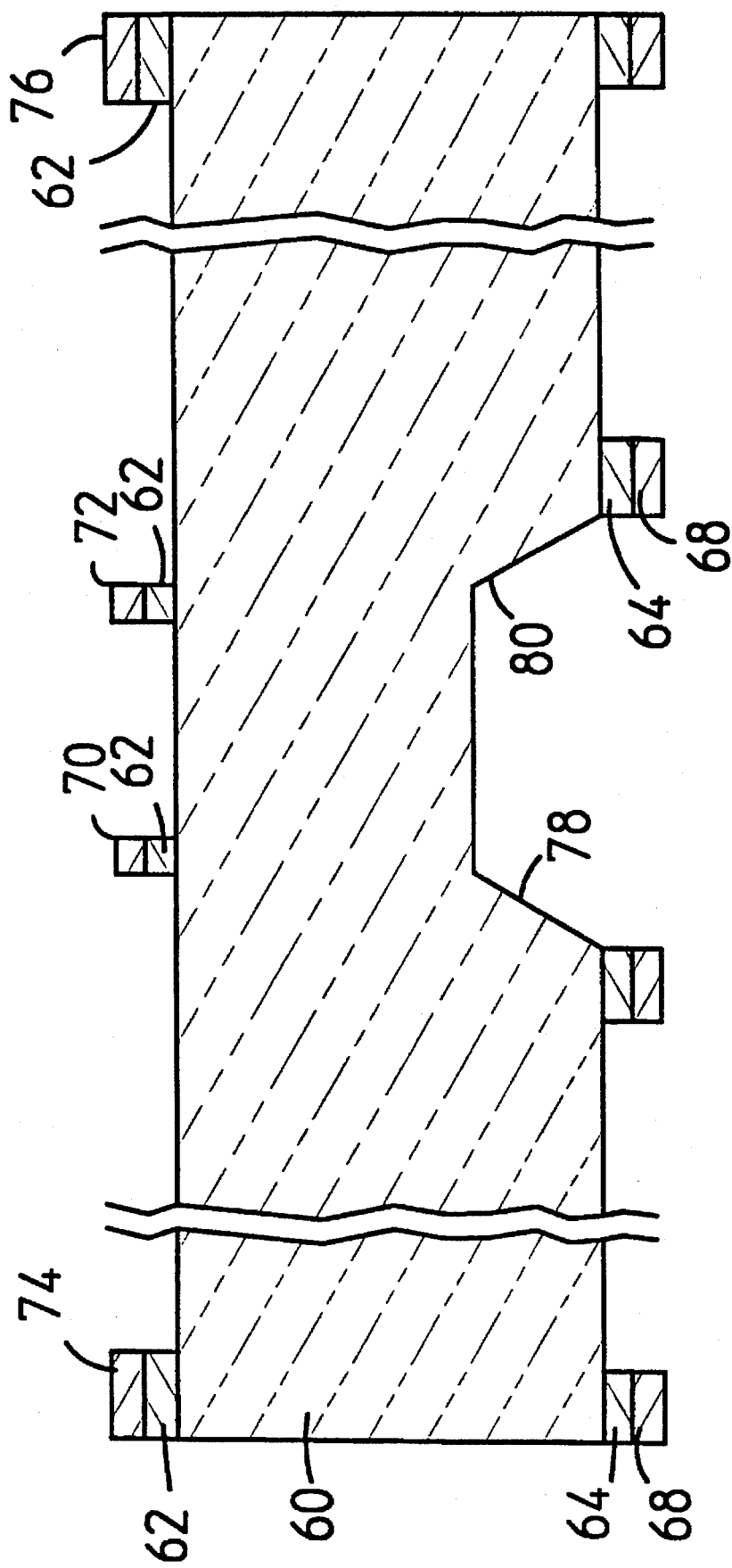
Figure 8:
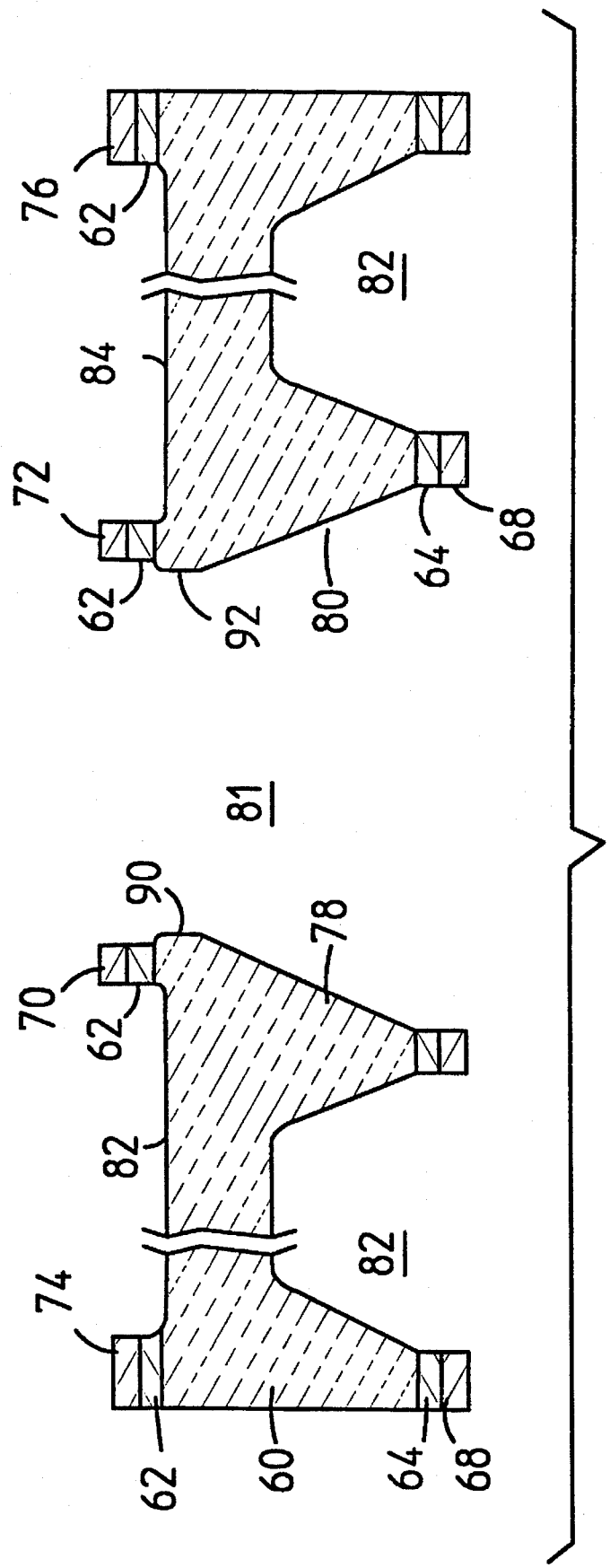

In FIGS. 7 and 8, the silicon nitride layer 66 is etched to leave a portion of the previously thick areas 70–76 and to completely remove the silicon nitride layer 66 between the thick areas, and the peripheral region that surrounds the central region of the bottom of the silicon wafer 60 is exposed by etching respective portions of the silicon nitride layer 68 and silicon oxide layer 64. Potassium hydroxide (KOH) is used to etch through the central and peripheral regions. The silicon is etched more slowly along (111) planes, thereby providing the sloped walls 78 and 80. Anisotropically etching the silicon wafer will produce walls having an angle of approximately 54.7 degrees. The anisotropic etch of the central region extends through the silicon wafer. Exposed oxide 62 is then etched in hydrofluoric acid. As a result, a central via 81 having upper and lower orifices is formed entirely through the silicon wafer 60 and a cell 82 is formed about the central via. However, the central via 81 does not resemble the final flow via to be fabricated. Rather, the etch from the bottom surface of the silicon wafer 60 provides the "rough" shape of a flow via.

Figure 9:
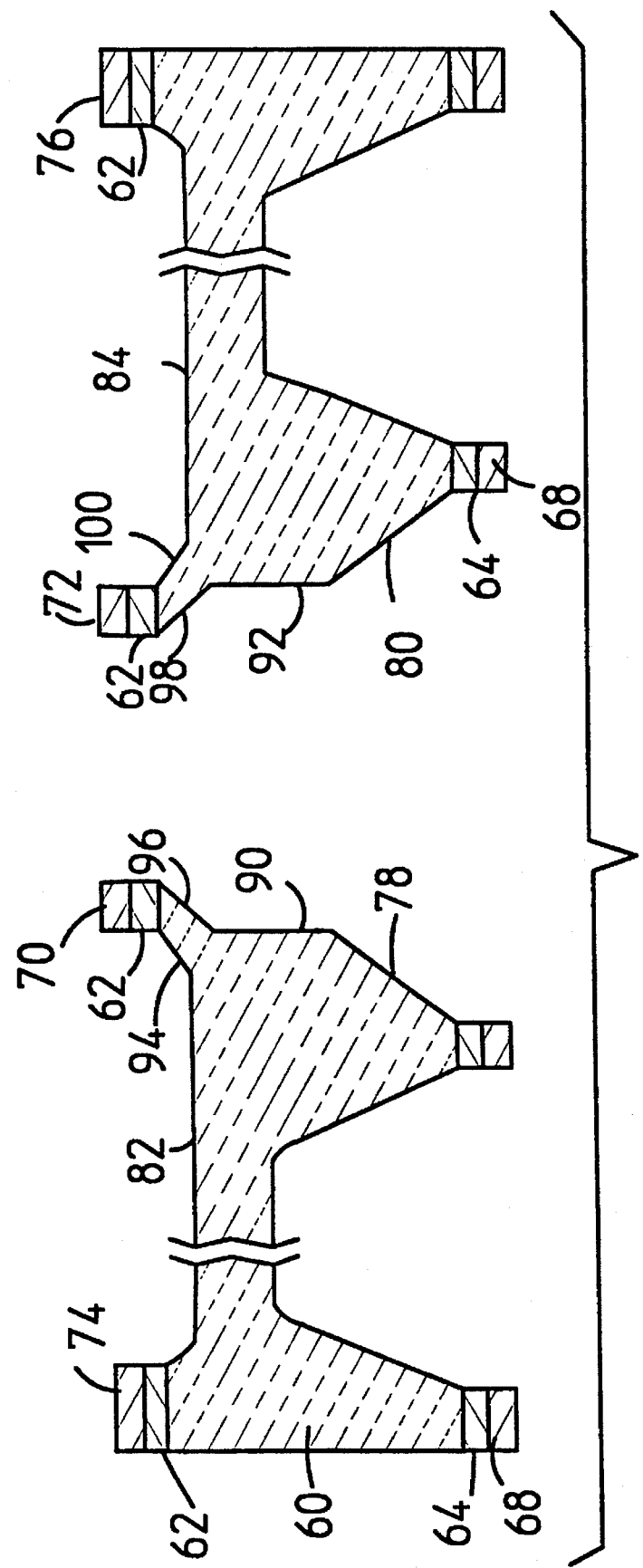

Referring now to FIG. 8, an anisotropic etch using KOH is then applied at both major surfaces of the semiconductor wafer 60. Exposed areas of the upper surface of the wafer are etched to form the inverted and truncated pyramidal faces 82 and 84. The depths of the truncated pyramidal faces will vary with the duration of the KOH etch. Initially, the etching applied at the upper surface will create the sloped walls 86 and 88 that are angled downwardly and inwardly along (111) planes. Substantially vertical walls 90 and 92 connect the radially inwardly directed walls 86 and 88 to the previously formed walls 78 and 80. As the anisotropic etch at the opposed sides of the silicon wafer 60 continues, the vertical walls 90 and 92 migrate downwardly, as shown in FIG. 9. The final configuration of the valve seat begins to form, as the anisotropic etching that takes place at the upper surface provides parallel opposed walls 94 and 96 and parallel opposed walls 98 and 100. As shown in this figure, the depth of the inverted and truncated pyramidal faces 82 and 84 increases with the etching time.

Figure 10:
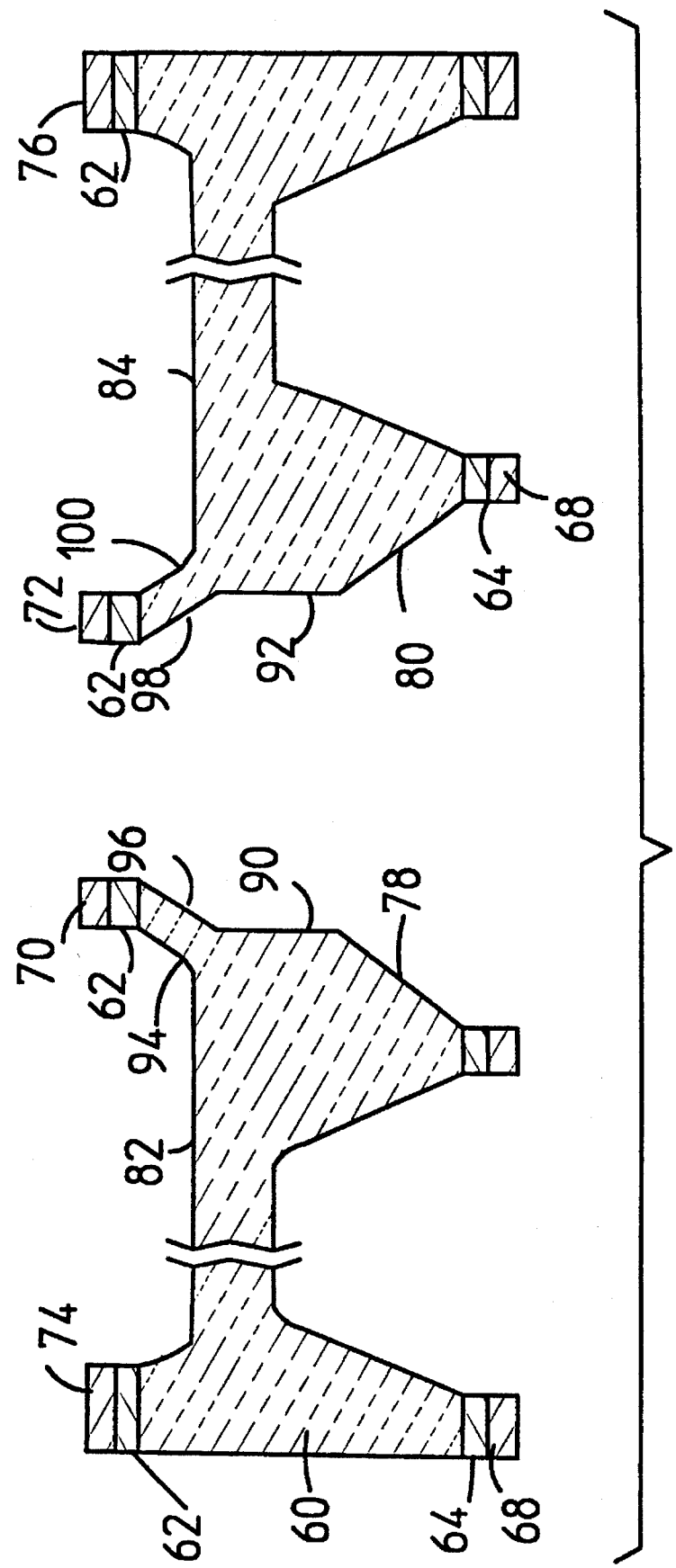

In FIG. 10, the vertical walls 90 and 92 have migrated downwardly and the pyramidal faces 82 and 84 have increased in depth. However, the cross sectional geometry of the valve seat as defined by the parallel walls 94 and 96 and the parallel walls 98 and 100 remains unchanged. As well known in the art, the geometry does change at the corners of a mask, so that steps are taken to ensure suitable results at mask corners. If desired, the etching can continue until the vertical walls 90 and 92 reach the lower surface of the silicon wafer 60, thereby providing 90 degree corners at the orifice of the resulting flow via.

Figure 2:
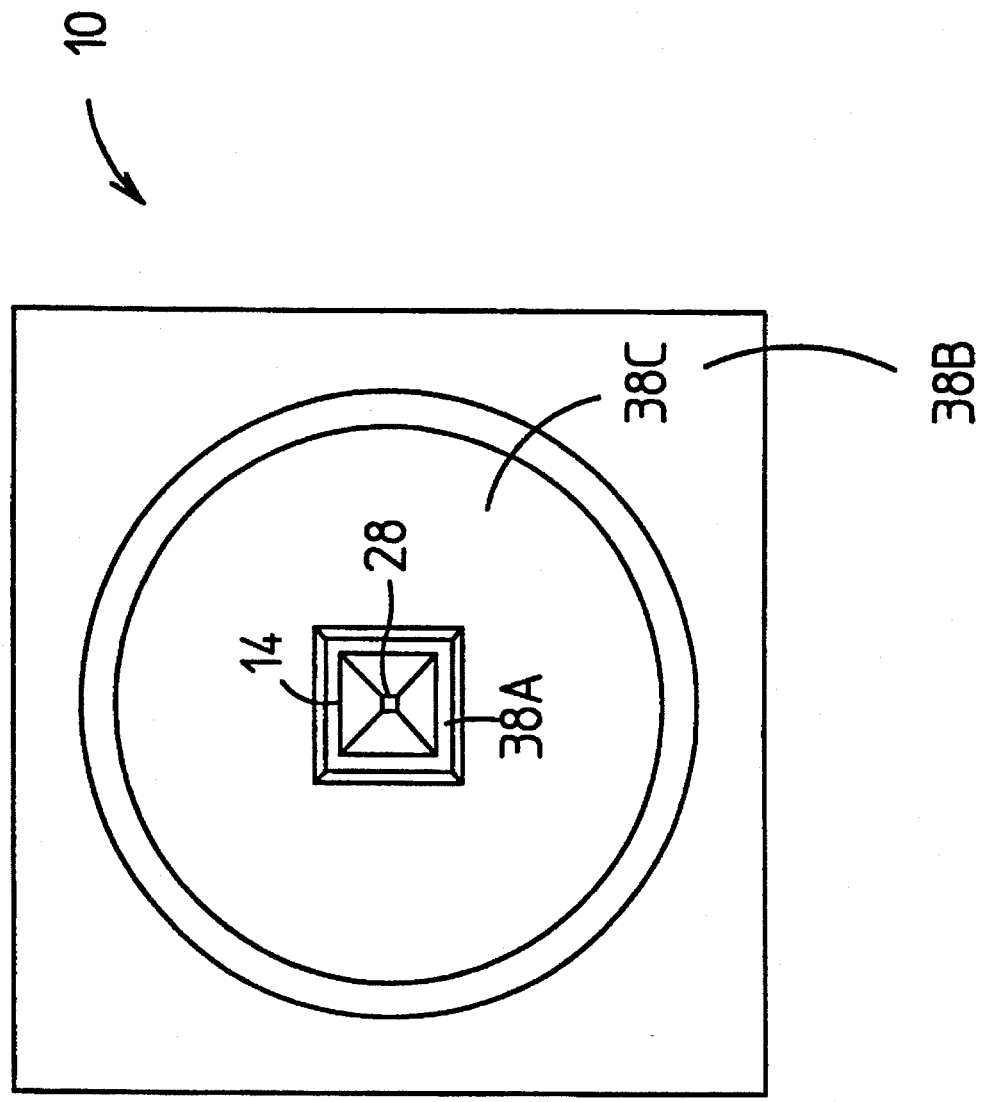
FIG. 2 is a plan view of the underside of the microactuator of FIG. 1.
Figure 3:
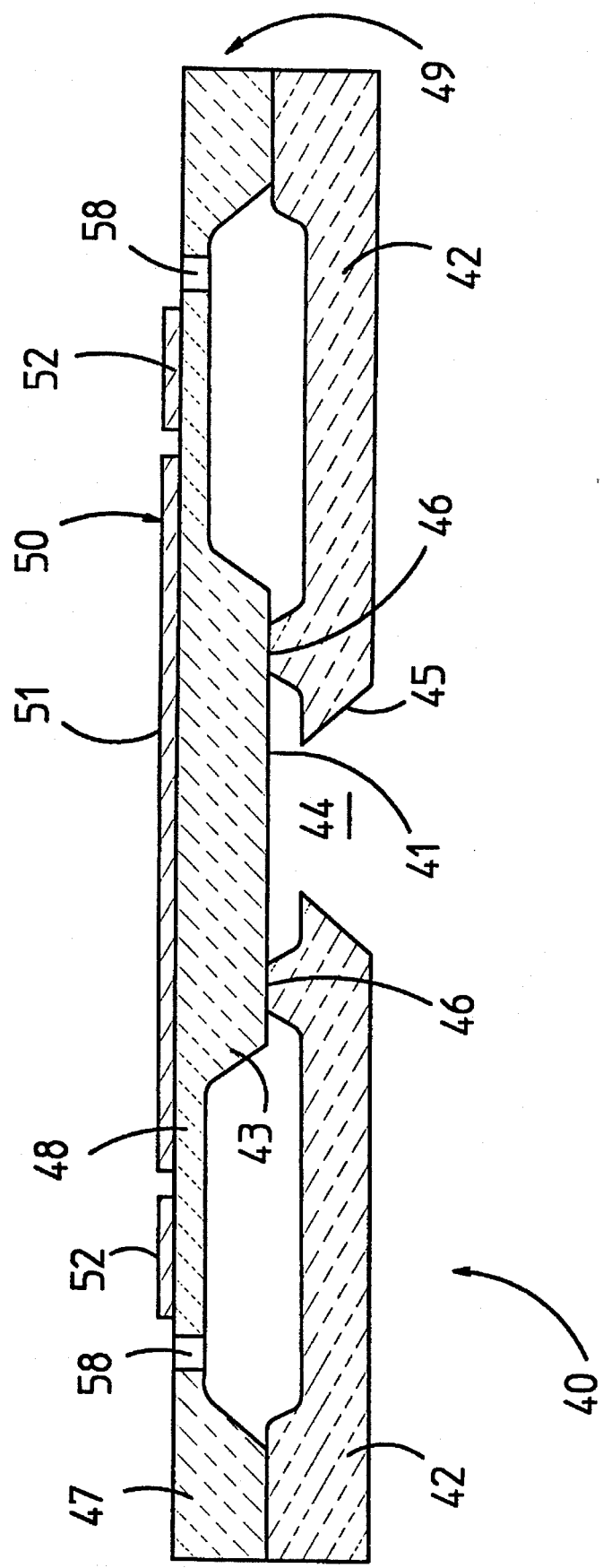
FIGS. 3 and 4 are side views of a prior art microminiature valve, shown in respectively closed and open modes.
Figure 4:
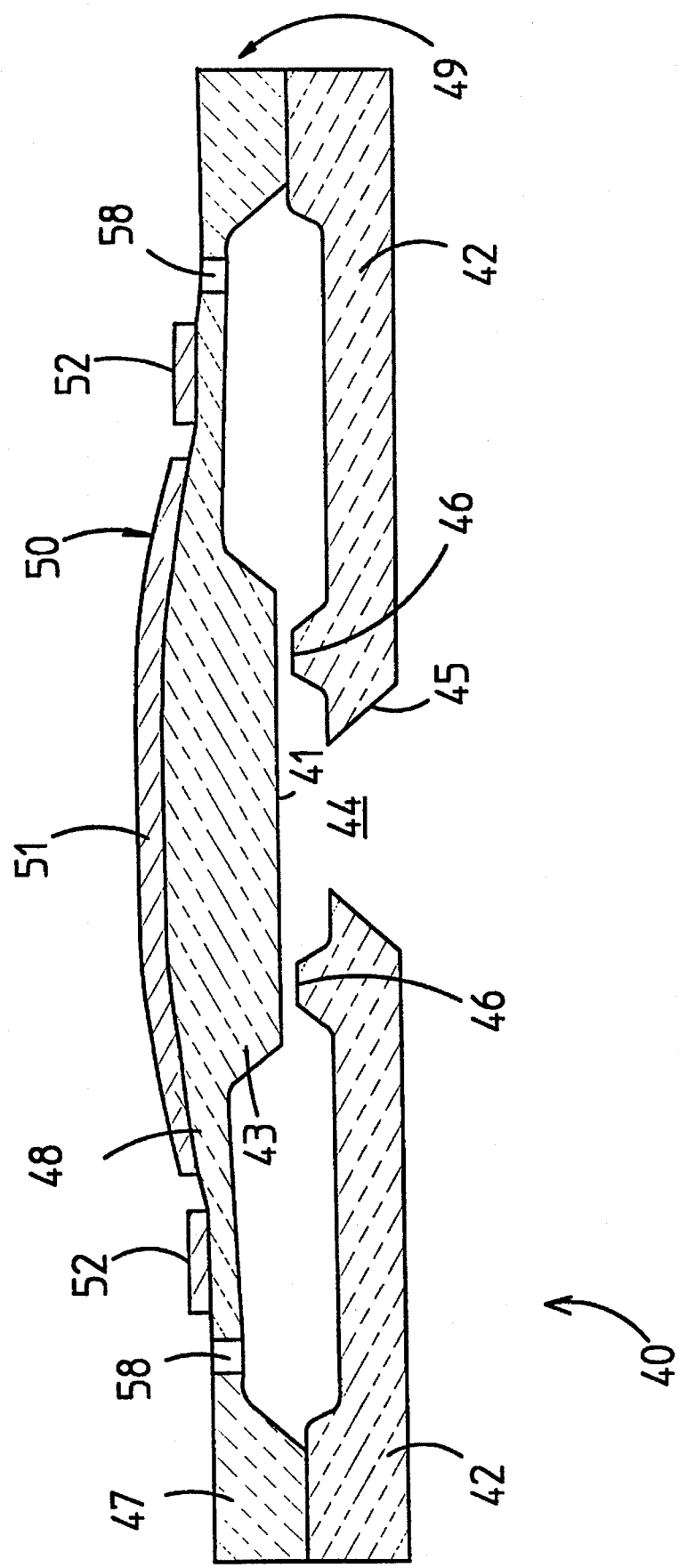
Figure 11:
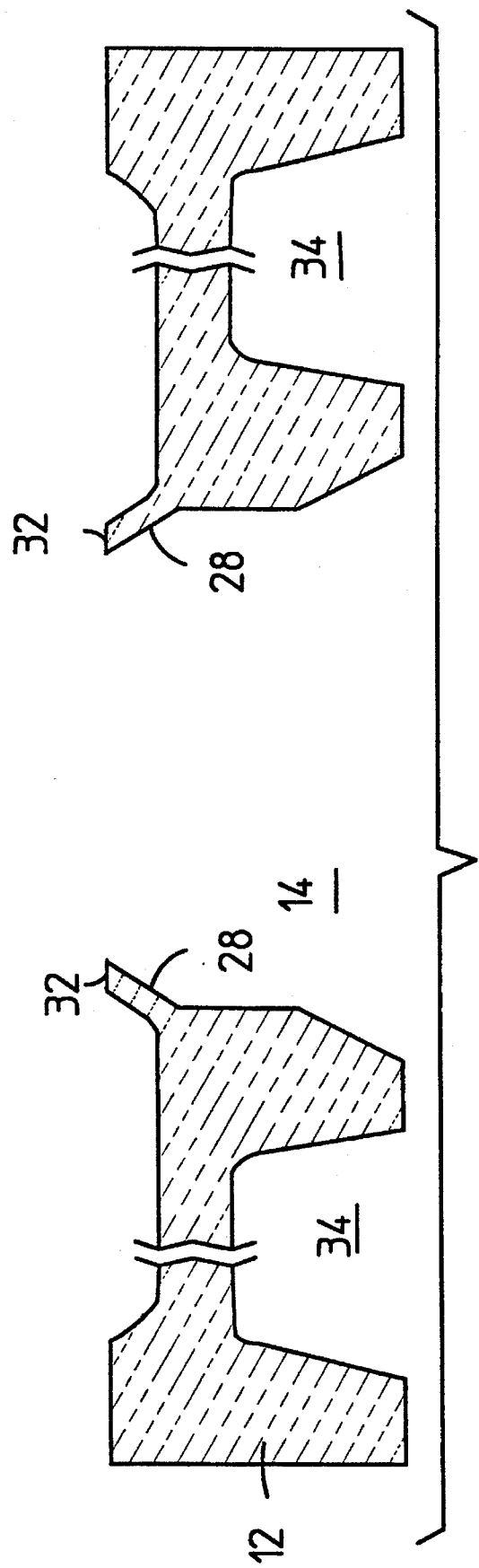

In FIG. 11, the masking material has been removed from the upper and lower surfaces of the silicon wafer, providing the seat substrate 12 of FIGS. 1 and 2. The substrate includes the valve seat 28 and the bearing surface 32 at the top of the valve seat. A central flow via 14 having the benefits described above is created.

Figure 12:
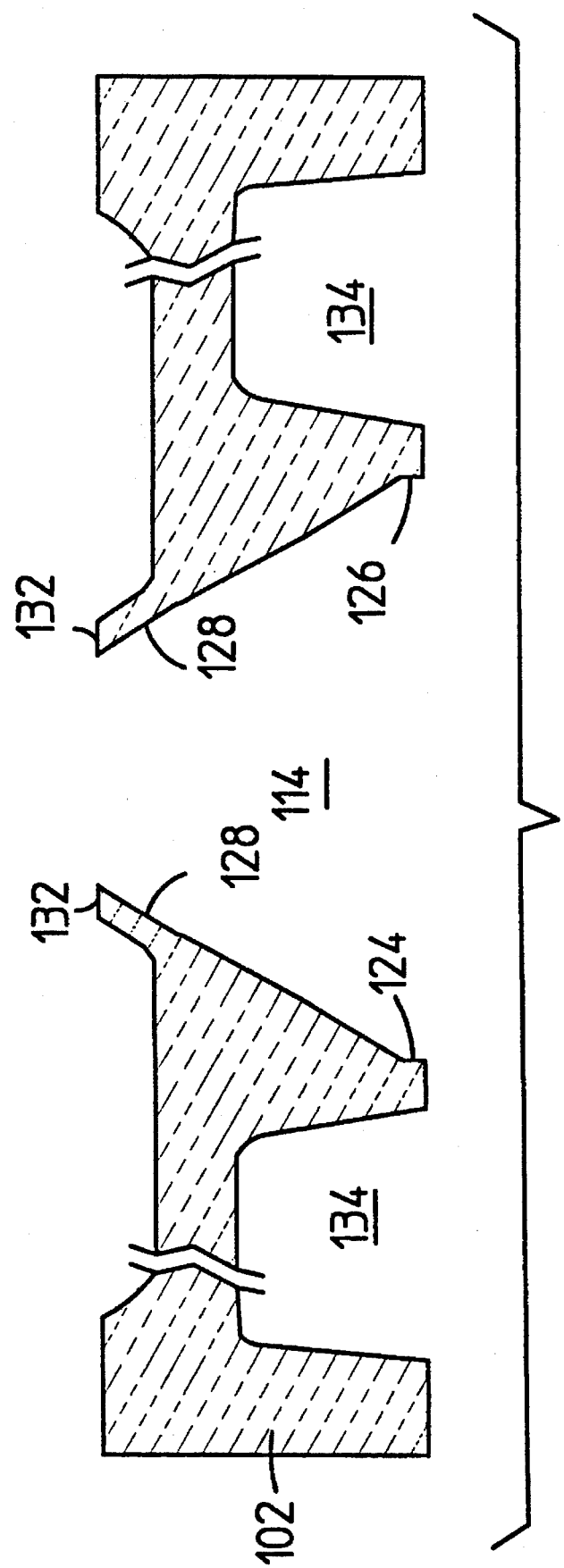
FIGS. 12, 13, and 14 illustrate second, third, and fourth preferred embodiments of a seat substrate useable in the microactuator of FIG. 1.
Figure 13:
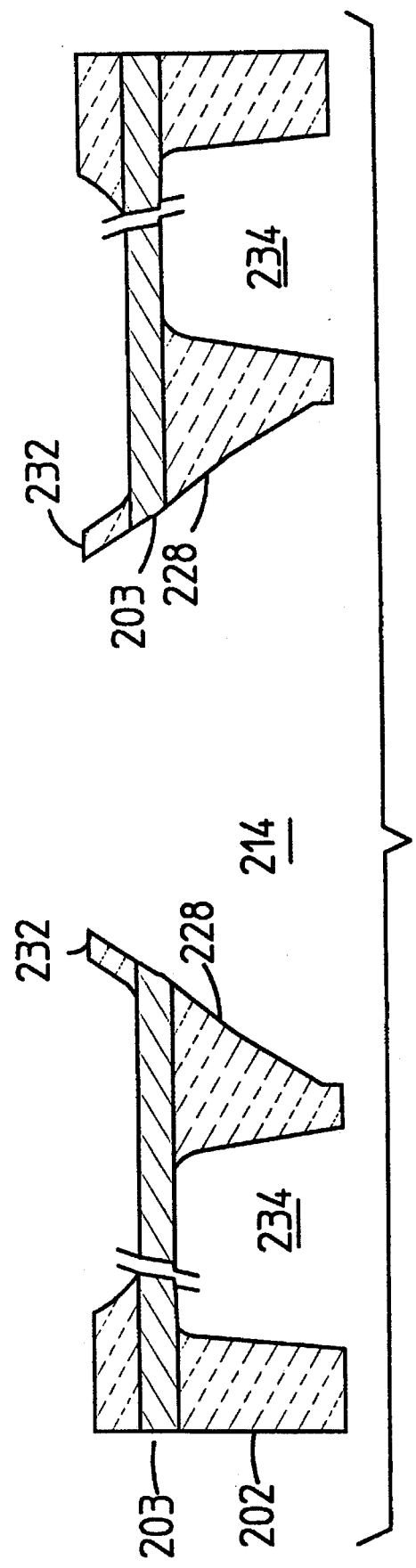

Second and third preferred embodiments of a seat substrate, formed in accordance with the foregoing steps, with some modifications, are respectively illustrated in FIGS. 12 and 13. In FIG. 12, a wafer 102 (preferably formed of silicon) is coated at its top and bottom surfaces with respective photolithographically patterned protective layers (preferably, of silicon nitride) in patterns similar to those illustrated in FIGS. 5–7. The upper protective layer is patterned to form protective regions and the wafer 102 is then etched from both sides in KOH to provide a central via 114, vertical walls 124 and 126, via wall 128, bearing seat 132, and isolation cell 134. In FIG. 13, a wafer 202 includes a structural layer 203 formed of a material having a thermal conductivity that is substantially less than the material forming the remainder of the wafer 202. Preferably, the wafer 202 is formed of silicon and the structural layer 203 is formed of silicon oxide ($SiO_2$). The wafer 202 is coated at its top and bottom surfaces with respective photolithographically patterned protective layers (preferably, of silicon nitride) in patterns similar to those illustrated in FIGS. 5–7. The wafer 202 is then etched from both sides in tetramethyl ammonium hydroxide (TMAH) to provide a central via 214, vertical walls 224 and 226, via wall 228, bearing seat 232, and isolation cell 234. Because the structural layer 203 exhibits less thermal conductivity than the wafer 202, less thermal energy is conducted from the bearing seat 232, thereby increasing the thermal isolation of the upper substrate 15.

Figure 14:
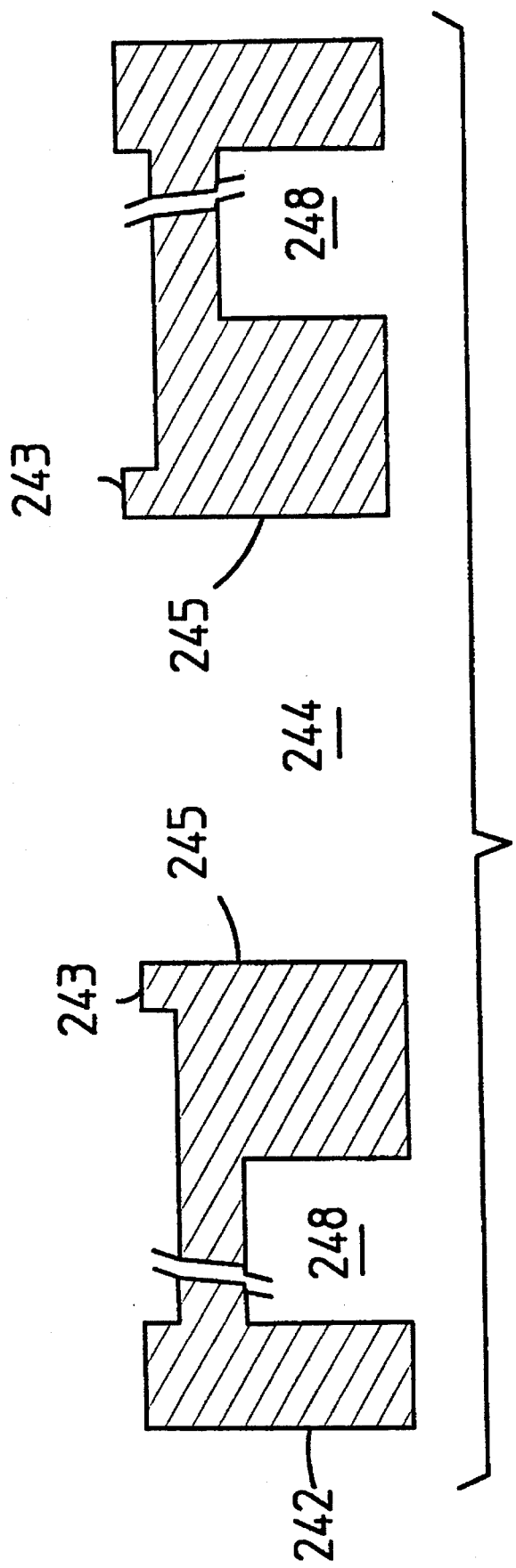

A fourth preferred embodiment of a seat is illustrated in FIG. 14. A wafer 242 (preferably composed of a precision-etchable material having a low coefficient of thermal conductivity) is coated at its top and bottom surfaces with respective photolithographically patterned protective layers in patterns similar to those illustrated in FIGS. 5–7. The upper protective layer is patterned to form protective regions and the wafer 242 is then etched from both sides in acid to provide a central via 244, bearing seat 243, vertical via wall 245, and isolation cell 248. A preferred composition of precision-etchable material having a low coefficient of thermal conductivity is photosensitive glass; suitable compositions may be selected from the FOTOFORM Glass Products and FOTOCERAM Glass-Ceramic Products available from Corning Fotoform Products Group, Corning, N.Y.

Figure 15:
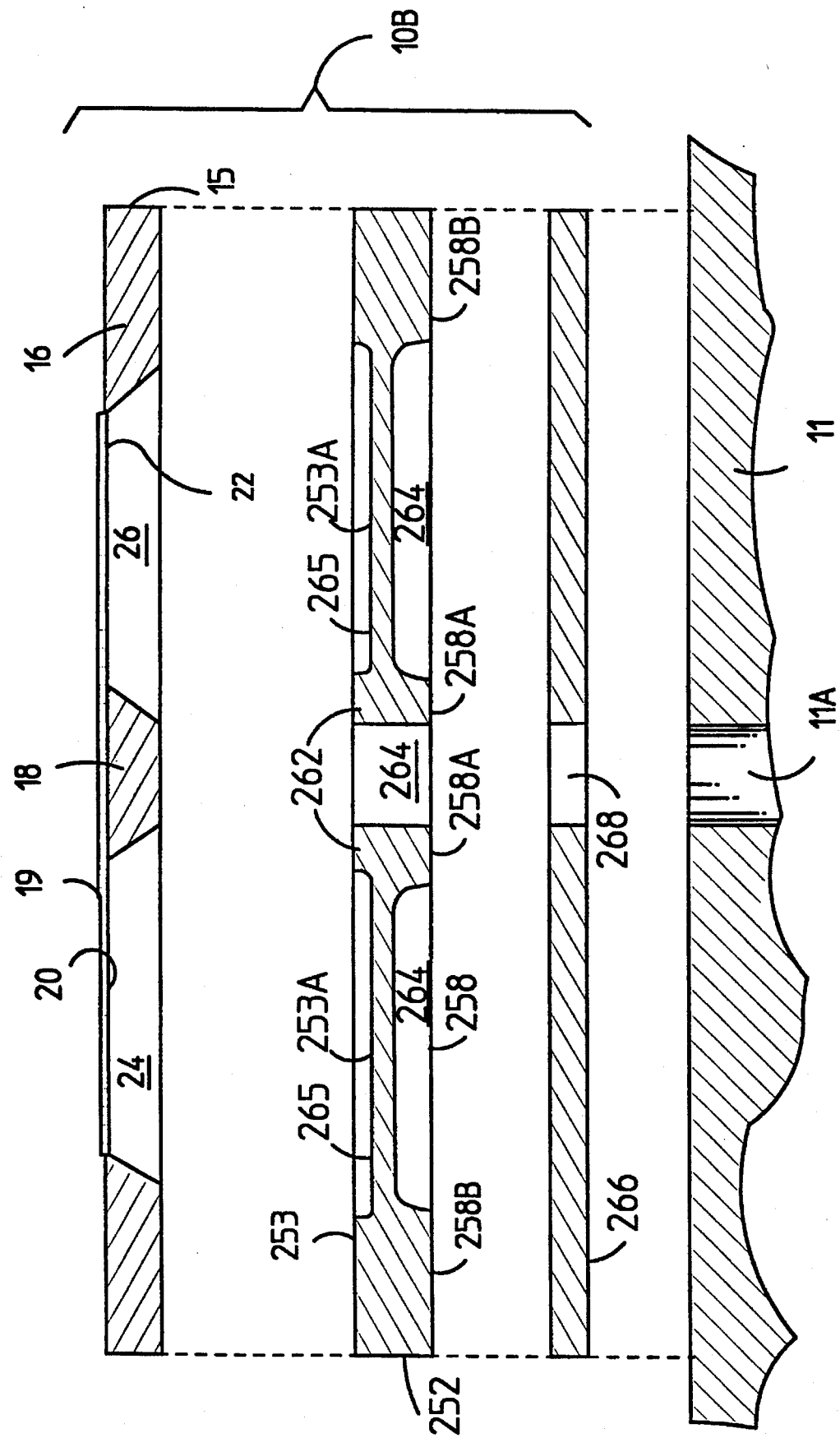
FIGS. 15 and 16 illustrate second and third preferred embodiments, respectively, of a microactuator constructed according to the present invention and preferred for use as a microminiature valve.
Figure 16:
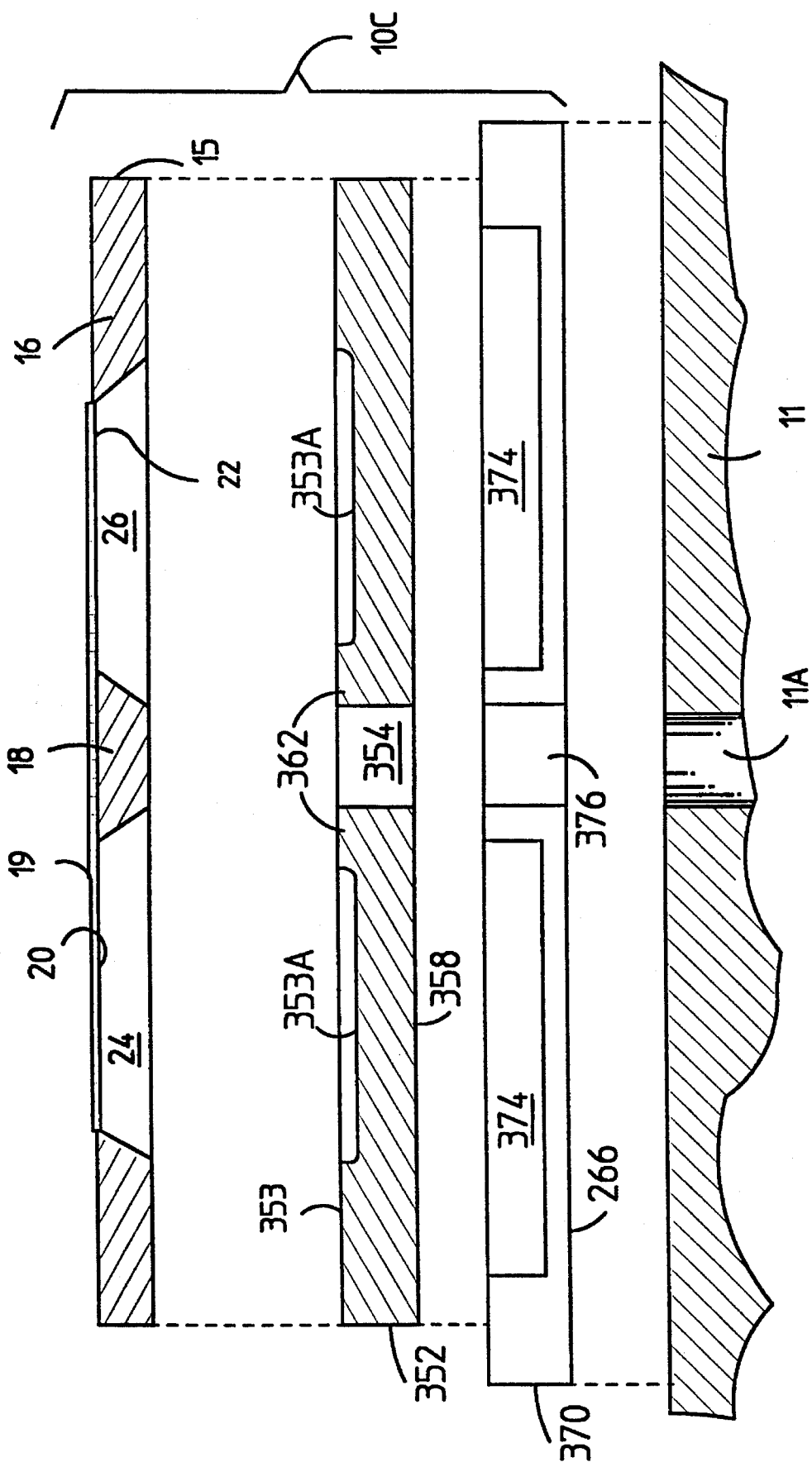

Second and third preferred embodiments of a novel microactuator in the form of a microminiature valve are respectively illustrated in FIGS. 15 and 16. In FIG. 15, a second microminiature valve 10B includes the upper substrate 15 described with respect to FIG. 1 and a seat substrate 252 including a valve seat 262 extending from a relief 253A in an upper major surface 253. The valve seat 262 and relief 253A are formed by precision etching the seat substrate 252 at the upper major surface 253 of the substrate. The seat substrate 252 includes a lower major surface 258 that is etched to form a central region 258A, a peripheral region 258B, and a via surround 265 so as to define an isolation cell 264. The flow via 254 and isolation cell 264 are formed by precision etching the seat substrate 252 at the lower major surface 258. A seat substrate plate 266 defines a central bore 266 that is sized and located so as to align coaxially with the flow via 254 upon bonding the seat substrate plate 266 to the lower major surface 258. The seat substrate 252 and seat substrate plate 266 are preferably composed of a precision-etchable material having a low coefficient of thermal conductivity so as to minimize the conduction of thermal energy from the valve seat 262 to the support 11. One such preferred composition is the above-described photosensitive glass. It is also preferred that the seat substrate plate 266 be bonded to the lower major surface 258 while in an appropriate environment such that the isolation cell 264 encloses a gas-filled or evacuated volume so as to maximize the thermal isolation.

In FIG. 16, a third preferred microminiature valve 10C includes a seat substrate 352 including a valve seat 362 extending upwardly from a relief 353A in an upper major surface 353. The valve seat 362 is formed by etching the seat substrate 352 at the upper major surface 353 of the substrate. The seat substrate 352 includes a lower major surface 358, a via surround 365, and flow via 354 formed by etching the seat substrate 352 at the upper major surface 353. The seat substrate 352 is bonded onto a port plate 311 that has been pressed, milled, etched, or otherwise altered by known methods to include an isolation cell 374 located about a flow port 376. It is also preferred that the seat substrate 353 be bonded to the valve support plate 370 while in an appropriate environment such that the isolation cell encloses a gas-filled or evacuated volume so as to maximize the thermal isolation of the third microminiature valve 10C. The port plate 370 may be bonded or attached by known means to the support 311 while the flow port 376 is coaxially aligned with the flow channel 311A so as to allow unobstructed flow through the flow channel 11A and the flow port 376 to the flow via 354. Similar to the seat substrate 252 of the second preferred embodiment, the seat substrate 352 of the third preferred embodiment is preferably composed of a precision-etchable material having a low coefficient of thermal conductivity, so as to minimize the conduction of thermal energy from the valve seat 362 to the port plate 370. One such preferred composition is the above-described photosensitive glass. The port plate 370 may also be formed of a precision-etchable material such as photosensitive glass for enhanced thermal isolation, or (in less demanding applications) of other materials such as metal or plastic.

While the present invention has been described as being fabricated from silicon or photosensitive glass substrates, other materials may be used. For example, other crystalline substrates such as gallium arsenide may be used, and modifications in the structure of the disclosed embodiments may be effected by use of differing patterns of etch-resistant coatings. In addition, alternative coatings such as silicon dioxide may be deposited or grown on the surface of the completed structure.

What is claimed is:

1. A thermally-actuated microactuator attachable to a support, comprising:
   a first substrate having a thermally-actuated member selectively operated by a thermal actuator, the first substrate thereby developing thermal energy therein; and
   a second substrate having opposed first and second major surfaces, the second substrate being attached to the first substrate at the first major surface and being attachable to the support at the second major surface, the second major surface defining an isolation cell for enclosing a volume when the second substrate is attached to the support, to thereby reduce the thermal mass of the microactuator and to thermally isolate the thermal energy developed in the first substrate.

2. The microactuator of claim 1 wherein the isolation cell occupies between 10 and 90 percent of the surface area of the second major surface and wherein the depth of the isolation cell is between 10 and 90 percent of the overall thickness of the first substrate.

3. The microactuator of claim 1, wherein the second substrate comprises a silicon wafer.

4. The microactuator of claim 1, wherein the second substrate comprises a photosensitive glass material.

5. The microactuator of claim 1, wherein the thermal actuator further comprises:
   first and second material layers having respectively different coefficients of thermal expansion; and
   heating means thermally coupled to one of the first and second layers for inducing differential expansion of the first and second layers.

6. The microactuator of claim 5 wherein the first material layer is silicon and the second material layer is metal.

7. The microactuator of claim 1 wherein the first and second substrates are bonded together and the second major surface is capable of being bonded to the support.

8. The microactuator of claim 1, wherein the volume is gas-filled.

9. The microactuator of claim 1, wherein the volume is evacuated.

10. The microactuator of claim 1, wherein the second major surface comprises central and peripheral regions with the isolation cell being located therebetween, and wherein the second substrate further comprises a flow via extending between the central region and the first major surface, the flow via being capable of alignment with a flow channel in the support to effect a fluid flow therethrough, said flow via being subject to closure by actuation of the thermally-actuated member.

11. The microactuator of claim 10, further comprising a substrate plate having a flow channel therein, the flow channel being aligned with the flow via, and the substrate plate being attached to the second major surface for enclosing the isolation cell in lieu of the support.

12. The microactuator of claim 10, wherein the second substrate further comprises a structural layer interposed between the first and second major surfaces and extending laterally between the flow via and the peripheral region, the structural layer having a thermal conductivity that is less than the thermal conductivity of the remainder of the second substrate such that the lateral flow of thermal energy is impeded.

13. The microactuator of claim 12, wherein the second substrate comprises a silicon wafer and the structural layer comprises silicon oxide.

14. A microminiature valve for controlling the flow of a fluid carried by a flow channel in a support, comprising,
   a first substrate having a thermally-actuated member selectively operated by a thermal actuator, the first substrate thereby developing thermal energy therein; and
   a second substrate having opposed first and second major surfaces, the second substrate being attached to the first substrate at the first major surface, wherein the second major surface comprises central and peripheral regions with a flow via extending between the central region and the first major surface to effect a fluid flow therethrough; said flow via being subject to closure by actuation of the thermally-actuated member; and
   a port plate having upper and lower opposing surfaces and a flow port therebetween, the upper surface defining an isolation cell for enclosing a volume, the flow port being aligned with the flow via and the flow channel and the upper surface being attached to the second major surface for enclosing the isolation cell to thereby thermally isolate at least a portion of the thermal energy developed in the first substrate.

15. The valve of claim 14, wherein the second substrate comprises a photosensitive glass material.

16. The valve of claim 14, wherein the port plate comprises a photosensitive glass material.

17. A microminiature valve for controlling the flow of a fluid carried by a flow channel in a support, comprising,
   a seat substrate having:
   a) opposed first and second major surfaces, the first major surface including central and peripheral regions and an isolation cell defined therebetween, the second major surface including a valve seat structure, and,
   b) a flow via extending between the valve seat structure and the central region, wherein the flow via being alignable on the support for fluid communication with channel and the first major surface being positionable on the support to enclose a volume between the isolation cell and the support to thereby thermally isolate the first substrate with respect to the support;
   an upper substrate having a boss positionable with respect to the valve seat structure in open and closed positions to respectively allow or obstruct fluid flow in the flow; and
   a thermal actuator for selectively displacing the boss between said closed and open positions.

18. A method of forming a microminiature valve adapted for control of a fluid carried by a flow channel in a support, comprising:
   providing a first substrate having first and second major surfaces, patterning a first mask on the first major surface, leaving a first exposed region in a central region of said first major surface, etching the first exposed region to remove a first portion of the first substrate, thereby forming a first via having first sloping walls extending at least partially through the first substrate, removing a portion of the first mask, leaving a second exposed region of the first major surface disposed between the first via and a peripheral region;

anisotropically etching the first major surface to complete the extension of the first via from the first major surface to the second major surface and to remove a second portion of the substrate corresponding to the second exposed region, to thereby create an isolation cell;

providing a second substrate including a thermally-actuated member positionable in a closed position to obstruct fluid flow to the flow via and an open position to allow fluid flow through the flow via; and bonding the first and second substrates together.

* * * * *